US006687789B1

(12) United States Patent
Keller et al.

(10) Patent No.: US 6,687,789 B1
(45) Date of Patent: Feb. 3, 2004

(54) CACHE WHICH PROVIDES PARTIAL TAGS FROM NON-PREDICTED WAYS TO DIRECT SEARCH IF WAY PREDICTION MISSES

(75) Inventors: James B. Keller, Palo Alto, CA (US); Keith R. Schakel, San Jose, CA (US); Puneet Sharma, Singapore (SG)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/476,577

(22) Filed: Jan. 3, 2000

(51) Int. Cl.$^7$ ............................................ G06F 12/00
(52) U.S. Cl. ..................... 711/128; 711/137; 711/156; 711/125
(58) Field of Search ................ 711/128, 137, 711/144, 145, 156, 125, 118

(56) References Cited

U.S. PATENT DOCUMENTS

| | | | |
|---|---|---|---|
| 4,914,582 A | | 4/1990 | Bryg et al. |
| 5,235,697 A | | 8/1993 | Steely, Jr. et al. |
| 5,418,922 A | | 5/1995 | Liu |
| 5,671,444 A | | 9/1997 | Akkary et al. |
| 5,752,069 A | | 5/1998 | Roberts et al. |
| 5,802,594 A | | 9/1998 | Wong et al. |
| 5,845,323 A | * | 12/1998 | Roberts et al. ............. 711/128 |
| 5,848,428 A | | 12/1998 | Collins |
| 5,893,146 A | | 4/1999 | Pickett |
| 5,956,746 A | * | 9/1999 | Wang ........................ 711/137 |
| 6,016,545 A | | 1/2000 | Mahalingaiah et al. |
| 6,240,488 B1 | * | 5/2001 | Mowry ....................... 711/128 |

FOREIGN PATENT DOCUMENTS

| | | |
|---|---|---|
| EP | 0 675 443 | 10/1995 |
| WO | 98/20421 | 5/1998 |

OTHER PUBLICATIONS

Patent Abstracts of Japan, Publication No. 07334423, published Dec. 22, 1995.

Kessler et al., "Inexpensive Implementations of Set-Associativity," Computer Architecture Conference Proceedings, Jun. 1989, pp. 131–139.

Search Report for International Application No. PCT/US 00/21756, mailed Nov. 17, 2000.

\* cited by examiner

*Primary Examiner*—Matthew Kim
*Assistant Examiner*—Matthew D. Anderson
(74) *Attorney, Agent, or Firm*—Lawrence J. Merkel; Meyertons, Hood, Kivlin, Kowert & Goetzel, P.C.

(57) ABSTRACT

A cache is coupled to receive an input address and a corresponding way prediction. The cache provides output bytes in response to the predicted way (instead of, performing tag comparisons to select the output bytes). Furthermore, a tag may be read from the predicted way and only partial tags are read from the non-predicted ways. The tag is compared to the tag portion of the input address, and the partial tags are compared to a corresponding partial tag portion of the input address. If the tag matches the tag portion of the input address, a hit in the predicted way is detected and the bytes provided in response to the predicted way are correct. If the tag does not match the tag portion of the input address, a miss in the predicted way is detected. If none of the partial tags match the corresponding partial tag portion of the input address, a miss in the cache is determined. On the other hand, if one or more of the partial tags match the corresponding partial tags portion of the input address, the cache searches the corresponding ways to determine whether or not the input address hits or misses in the cache.

33 Claims, 10 Drawing Sheets

CACHE WHICH PROVIDES PARTIAL TAGS FROM NON-PREDICTED WAYS TO DIRECT SEARCH IF WAY PREDICTION MISSES

BACKGROUND OF THE INVENTION

1. Field of the Invention

This invention is related to the field of processors and, more particularly, to caching mechanisms within processors.

2. Description of the Related Art

Superscalar processors achieve high performance by simultaneously executing multiple instructions in a clock cycle and by specifying the shortest possible clock cycle consistent with the design. As used herein, the term "clock cycle" refers to an interval of time during which the pipeline stages of a processor perform their intended functions. At the end of a clock cycle, the resulting values are moved to the next pipeline stage. Clocked storage devices (e.g. registers, latches, flops, etc.) may capture their values in response to a clock signal defining the clock cycle.

To reduce effective memory latency, processors typically include caches. Caches are high speed memories used to store previously fetched instruction and/or data bytes. The cache memories may be capable of providing substantially lower memory latency than the main memory employed within a computer system including the processor.

Caches may be organized into a "set associative" structure. In a set associative structure, the cache is organized as a two-dimensional array having rows (often referred to as "sets") and columns (often referred to as "ways"). When a cache is searched for bytes residing at an address, a number of bits from the address are used as an "index" into the cache. The index selects a particular set within the two-dimensional array, and therefore the number of address bits required for the index is determined by the number of sets configured into the cache. The act of selecting a set via an index is referred to as "indexing". Each way of the cache has one cache line storage location which is a member of the selected set (where a cache line is a number of contiguous bytes treated as a unit for storage in the cache, and may typically be in the range of 16–64 bytes, although any number of bytes may be defined to compose a cache line). The addresses associated with bytes stored in the ways of the selected set are examined to determine if any of the addresses stored in the set match the requested address. If a match is found, the access is said to be a "hit", and the cache provides the associated bytes. If a match is not found, the access is said to be a "miss". When a miss is detected, the bytes are transferred from the main memory system into the cache. The addresses associated with bytes stored in the cache are also stored. These stored addresses are referred to as "tags" or "tag addresses".

As mentioned above, a cache line storage location from each way of the cache is a member of the selected set (i.e. is accessed in response to selecting the set). Information stored in one of the ways is provided as the output of the cache, and that way is selected by providing a way selection to the cache. The way selection identifies the way to be selected as an output. In a typical set associative cache, the way selection is determined by examining the tags within a set and finding a match between one of the tags and the requested address.

Unfortunately, set associative caches may be higher latency than a direct mapped cache (which provides one cache line storage location per index) due to the tag comparison to determine the way selection for the output. Furthermore, since the way selection is not known prior to the access, each way is typically accessed and the corresponding way selection is used to late select the output bytes if a hit is detected. Accessing all of the ways may cause undesirably high power consumption. Limiting power consumption is rapidly achieving equal par with increasing operating speed (or frequency) in modem processors. Accordingly, a low latency, low power consuming method for accessing a set associative cache is desired.

SUMMARY OF THE INVENTION

The problems outlined above are in large part solved by a cache as disclosed herein. The cache is coupled to receive an input address and a corresponding way prediction. The cache provides output bytes in response to the predicted way (instead of performing tag comparisons to select the output bytes), and thus may reduce access latency as compared to performing the tag comparisons. Furthermore, a tag may be read from the predicted way and only partial tags are read from the non-predicted ways. The tag is compared to the tag portion of the input address, and the partial tags are compared to a corresponding partial tag portion of the input address. If the tag matches the tag portion of the input address, a hit in the predicted way is detected and the bytes provided in response to the predicted way are correct. If the tag does not match the tag portion of the input address, a miss in the predicted way is detected. If none of the partial tags match the corresponding partial tag portion of the input address, a miss in the cache is determined. On the other hand, if one or more of the partial tags match the corresponding partial tags portion of the input address, the cache searches the corresponding ways to determine whether or not the input address hits or misses in the cache (e.g. by performing full tag comparisons for the ways in which a partial tag match is detected). Because partial tags are read from the non-predicted ways, power may be conserved as compared to reading the full tags from each of the ways. Advantageously, both access latency and power consumption may be reduced. Furthermore, by providing partial tags, the other ways to be searched may be identified and the number of ways to be searched may be reduced (e.g. each way having a partial tag miss may not be searched).

Broadly speaking, a cache is contemplated. The cache comprises a tag array and a control circuit coupled to the tag array. The tag array is coupled to receive an index of a read address and a way selection, and comprises a plurality of ways. The tag array is configured to output a plurality of partial tags, each of which is from one of the plurality of ways. The control circuit is configured to generate a search way selection identifying a search way responsive to the read address missing in a first way of the plurality of ways of the tag array. The first way is identified by the way selection. A first partial tag from the search way matches a corresponding portion of the read address.

Additionally, a processor is contemplated. The processor comprises a line predictor configured to provide a way prediction responsive to a fetch address, and an instruction cache coupled to receive the way prediction and the fetch address. The instruction cache is set associative and includes a tag array configured to output a plurality of partial tags responsive to an index of the fetch address. The instruction cache is configured, responsive to the fetch address missing in a first way identified by the way prediction, to search a second way of the tag array for which a corresponding partial tag of the plurality of partial tags matches a corresponding portion of the fetch address. Still further, a computer system is contemplated including the processor and an input/output (I/O) device configured to communicate between the computer system and another computer system to which the I/O device is couplable.

Moreover, a method is contemplated. A plurality of partial tags are read from a cache responsive to a fetch address. Whether or not the fetch address hits in a predicted way of the cache is determined. A second way of the cache is searched for a hit in response to determining that the fetch address does not hit in the predicted way of the cache. The second way is different from the predicted way and a first partial tag of the plurality of partial tags corresponding to the second way matches a corresponding portion of the fetch address.

BRIEF DESCRIPTION OF THE DRAWINGS

Other objects and advantages of the invention will become apparent upon reading the following detailed description and upon reference to the accompanying drawings in which.

Figure 1:
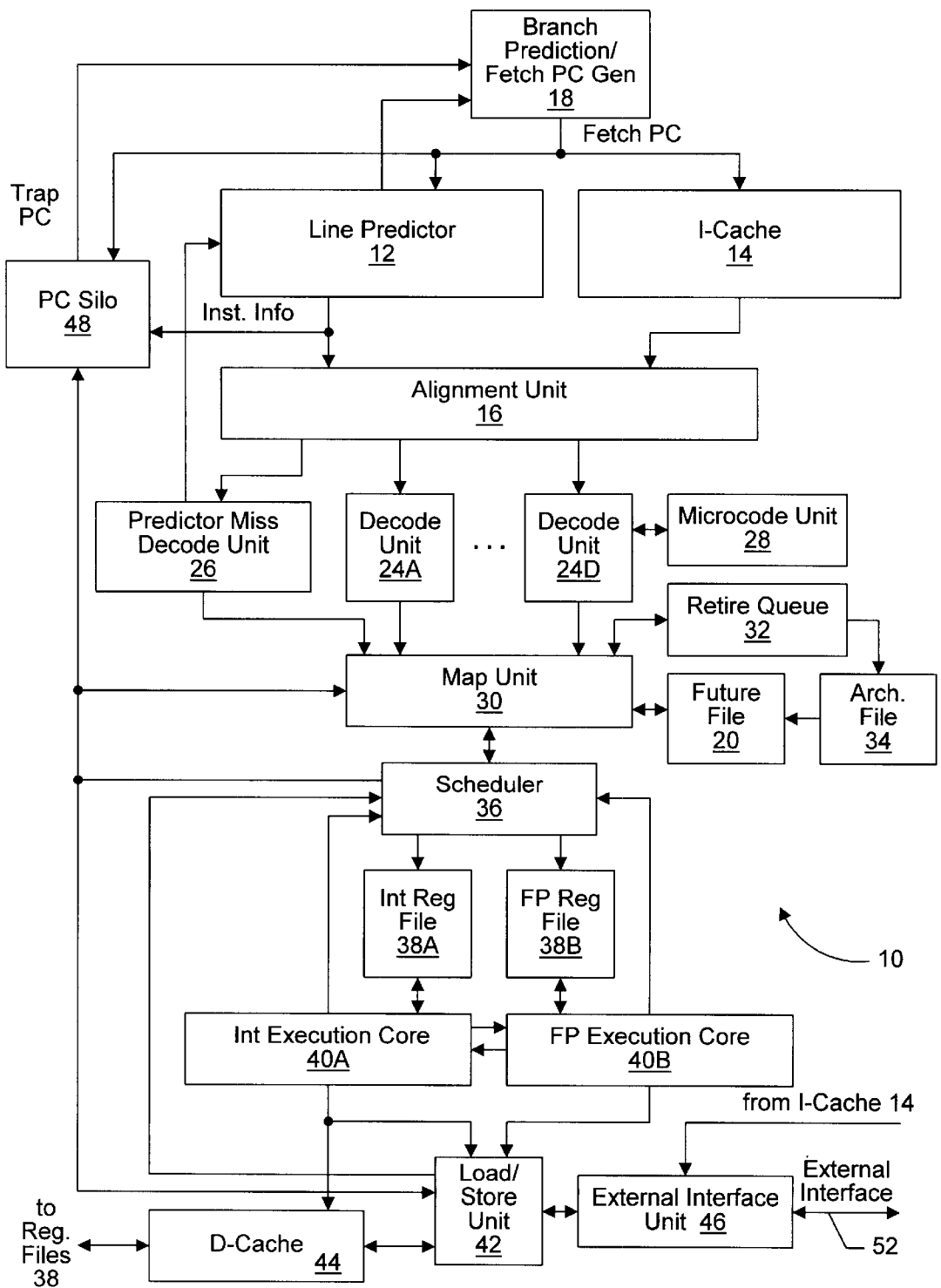
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Processor Overview

Turning now to FIG. 1, a block diagram of one embodiment of a processor 10 is shown. Other embodiments are possible and contemplated. In the embodiment of FIG. 1, processor 10 includes a line predictor 12, an instruction cache (I-cache) 14, an alignment unit 16, a branch prediction/fetch PC generation unit 18, a plurality of decode units 24A–24D, a predictor miss decode unit 26, a microcode unit 28, a map unit 30, a retire queue 32, an architectural renames file 34, a future file 20, a scheduler 36, an integer register file 38A, a floating point register file 38B, an integer execution core 40A, a floating point execution core 40B, a load/store unit 42, a data cache (D-cache) 44, an external interface unit 46, and a PC silo 48. Line predictor 12 is coupled to predictor miss decode unit 26, branch prediction/fetch PC generation unit 18, PC silo 48, and alignment unit 16. Line predictor 12 may also be coupled to I-cache 14. I-cache 14 is coupled to alignment unit 16 and branch prediction/fetch PC generation unit 18, which is further coupled to PC silo 48. Alignment unit 16 is further coupled to predictor miss decode unit 26 and decode units 24A–24D. Decode units 24A–24D are further coupled to map unit 30, and decode unit 24D is coupled to microcode unit 28. Map unit 30 is coupled to retire queue 32 (which is coupled to architectural renames file 34), future file 20, scheduler 36, and PC silo 48. Architectural renames file 34 is coupled to future file 20. Scheduler 36 is coupled to register files 38A–38B, which are further coupled to each other and respective execution cores 40A–40B. Execution cores 40A–40B are further coupled to load/store unit 42 and scheduler 36. Execution core 40A is further coupled to D-cache 44. Load/store unit 42 is coupled to scheduler 36, D-cache 44, and external interface unit 46. D-cache 44 is coupled to register files 38. External interface unit 46 is coupled to an external interface 52 and to I-cache 14. Elements referred to herein by a reference numeral followed by a letter will be collectively referred to by the reference numeral alone. For example, decode units 24A–24D will be collectively referred to as decode units 24.

In the embodiment of FIG. 1, processor 10 employs a variable byte length, complex instruction set computing (CISC) instruction set architecture. For example, processor 10 may employ the x86 instruction set architecture (also referred to as IA-32). Other embodiments may employ other instruction set architectures including fixed length instruction set architectures and reduced instruction set computing (RISC) instruction set architectures. Certain features shown in FIG. 1 may be omitted in such architectures.

Branch prediction/fetch PC generation unit 18 is configured to provide a fetch address (fetch PC) to I-cache 14, line predictor 12, and PC silo 48. Branch prediction/fetch PC generation unit 18 may include a suitable branch prediction mechanism used to aid in the generation of fetch addresses. In response to the fetch address, line predictor 12 provides alignment information corresponding to a plurality of instructions to alignment unit 16, and may provide a next fetch address for fetching instructions subsequent to the instructions identified by the provided instruction information. The next fetch address may be provided to branch prediction/fetch PC generation unit 18 or may be directly provided to I-cache 14, as desired. Branch prediction/fetch PC generation unit 18 may receive a trap address from PC silo 48 (if a trap is detected) and the trap address may comprise the fetch PC generated by branch prediction/fetch PC generation unit 18. Otherwise, the fetch PC may be generated using the branch prediction information and information from line predictor 12. Generally, line predictor 12 stores information corresponding to instructions previously speculatively fetched by processor 10. In one embodiment, line predictor 12 includes 2K entries, each entry locating a group of one or more instructions referred to herein as a "line" of instructions. The line of instructions may be concurrently processed by the instruction processing pipeline of processor 10 through being placed into scheduler 36.

I-cache 14 is a high speed cache memory for storing instruction bytes. According to one embodiment I-cache 14 may comprise, for example, a 128 Kbyte, four way set associative organization employing 64 byte cache lines. However, any I-cache structure may be suitable (including direct-mapped structures).

Alignment unit 16 receives the instruction alignment information from line predictor 12 and instruction bytes corresponding to the fetch address from I-cache 14. Alignment unit 16 selects instruction bytes into each of decode units 24A–24D according to the provided instruction alignment information. More particularly, line predictor 12 provides an instruction pointer corresponding to each decode unit 24A–24D. The instruction pointer locates an instruction within the fetched instruction bytes for conveyance to the corresponding decode unit 24A–24D. In one embodiment, certain instructions may be conveyed to more than one decode unit 24A–24D. Accordingly, in the embodiment shown, a line of instructions from line predictor 12 may include up to 4 instructions, although other embodiments may include more or fewer decode units 24 to provide for more or fewer instructions within a line.

Decode units 24A–24D decode the instructions provided thereto, and each decode unit 24A–24D generates information identifying one or more instruction operations (or ROPs) corresponding to the instructions. In one embodiment, each decode unit 24A–24D may generate up to two instruction operations per instruction. As used herein, an instruction operation (or ROP) is an operation which an execution unit within execution cores 40A–40B is configured to execute as a single entity. Simple instructions may correspond to a single instruction operation, while more complex instructions may correspond to multiple instruction operations. Certain of the more complex instructions may be implemented within microcode unit 28 as microcode routines (fetched from a read-only memory therein via decode unit 24D in the present embodiment). Furthermore, other embodiments may employ a single instruction operation for each instruction (i.e. instruction and instruction operation may be synonymous in such embodiments).

PC silo 48 stores the fetch address and instruction information for each instruction fetch, and is responsible for redirecting instruction fetching upon exceptions (such as instruction traps defined by the instruction set architecture employed by processor 10, branch mispredictions, and other microarchitecturally defined traps). PC silo 48 may include a circular buffer for storing fetch address and instruction information corresponding to multiple lines of instructions which may be outstanding within processor 10. In response to retirement of a line of instructions, PC silo 48 may discard the corresponding entry. In response to an exception, PC silo 48 may provide a trap address to branch prediction/fetch PC generation unit 18. Retirement and exception information may be provided by scheduler 36. In one embodiment, PC silo 48 assigns a sequence number (R#) to each instruction to identify the order of instructions outstanding within processor 10. Scheduler 36 may return R#s to PC silo 48 to identify instruction operations experiencing exceptions or retiring instruction operations.

Upon detecting a miss in line predictor 12, alignment unit 16 routes the corresponding instruction bytes from I-cache 14 to predictor miss decode unit 26. Predictor miss decode unit 26 decodes the instruction, enforcing any limits on a line of instructions as processor 10 is designed for (e.g. maximum number of instruction operations, maximum number of instructions, terminate on branch instructions, etc.). Upon terminating a line, predictor miss decode unit 26 provides the information to line predictor 12 for storage. It is noted that predictor miss decode unit 26 may be configured to dispatch instructions as they are decoded. Alternatively, predictor miss decode unit 26 may decode the line of instruction information and provide it to line predictor 12 for storage. Subsequently, the missing fetch address may be reattempted in line predictor 12 and a hit may be detected.

In addition to decoding instructions upon a miss in line predictor 12, predictor miss decode unit 26 may be configured to decode instructions if the instruction information provided by line predictor 12 is invalid. In one embodiment, processor 10 does not attempt to keep information in line predictor 12 coherent with the instructions within I-cache 14 (e.g. when instructions are replaced or invalidate in I-cache 14, the corresponding instruction information may not actively be invalidated). Decode units 24A–24D may verify the instruction information provided, and may signal predictor miss decode unit 26 when invalid instruction information is detected. According to one particular embodiment, the following instruction operations are supported by processor 10: integer (including arithmetic, logic, shift/rotate, and branch operations), floating point (including multimedia operations), and load/store.

The decoded instruction operations and source and destination register numbers are provided to map unit 30. Map unit 30 is configured to perform register renaming by assigning physical register numbers (PR#s) to each destination register operand and source register operand of each instruction operation. The physical register numbers identify registers within register files 38A–38B. Map unit 30 additionally provides an indication of the dependencies for each instruction operation by providing R#s of the instruction operations which update each physical register number assigned to a source operand of the instruction operation. Map unit 30 updates future file 20 with the physical register numbers assigned to each destination register (and the R# of the corresponding instruction operation) based on the corresponding logical register number. Additionally, map unit 30 stores the logical register numbers of the destination registers, assigned physical register numbers, and the previously assigned physical register numbers in retire queue 32. As instructions are retired (indicated to map unit 30 by scheduler 36), retire queue 32 updates architectural renames file 34 and frees any registers which are no longer in use. Accordingly, the physical register numbers in architectural register file 34 identify the physical registers storing the committed architectural state of processor 10, while future file 20 represents the speculative state of processor 10. In other words, architectural renames file 34 stores a physical register number corresponding to each logical register, representing the committed register state for each logical register. Future file 20 stores a physical register number corresponding to each logical register, representing the speculative register state for each logical register.

The line of instruction operations, source physical register numbers, and destination physical register numbers are stored into scheduler 36 according to the R#s assigned by PC silo 48. Furthermore, dependencies for a particular instruction operation may be noted as dependencies on other instruction operations which are stored in the scheduler. In one embodiment, instruction operations remain in scheduler 36 until retired.

Scheduler 36 stores each instruction operation until the dependencies noted for that instruction operation have been satisfied. In response to scheduling a particular instruction operation for execution, scheduler 36 may determine at which clock cycle that particular instruction operation will update register files 38A–38B. Different execution units within execution cores 40A–40B may employ different numbers of pipeline stages (and hence different latencies). Furthermore, certain instructions may experience more latency within a pipeline than others. Accordingly, a countdown is generated which measures the latency for the particular instruction operation (in numbers of clock cycles). Scheduler 36 awaits the specified number of clock cycles (until the update will occur prior to or coincident with the dependent instruction operations reading the register file), and then indicates that instruction operations dependent upon that particular instruction operation may be scheduled. It is noted that scheduler 36 may schedule an instruction once its dependencies have been satisfied (i.e. out of order with respect to its order within the scheduler queue).

Integer and load/store instruction operations read source operands according to the source physical register numbers from register file 38A and are conveyed to execution core 40A for execution. Execution core 40A executes the instruction operation and updates the physical register assigned to the destination within register file 38A. Additionally, execution core 40A reports the R# of the instruction operation and exception information regarding the instruction operation (if any) to scheduler 36. Register file 38B and execution core 40B may operate in a similar fashion with respect to floating point instruction operations (and may provide store data for floating point stores to load/store unit 42).

In one embodiment, execution core 40A may include, for example, two integer units, a branch unit, and two address generation units (with corresponding translation lookaside buffers, or TLBs). Execution core 40B may include a floating point/multimedia multiplier, a floating point/multimedia adder, and a store data unit for delivering store data to load/store unit 42. Other configurations of execution units are possible.

Load/store unit 42 provides an interface to D-cache 44 for performing memory operations and for scheduling fill operations for memory operations which miss D-cache 44. Load memory operations may be completed by execution core 40A performing an address generation and forwarding data to register files 38A–38B (from D-cache 44 or a store queue within load/store unit 42). Store addresses may be presented to D-cache 44 upon generation thereof by execution core 40A (directly via connections between execution core 40A and D-Cache 44). The store addresses are allocated a store queue entry. The store data may be provided concurrently, or may be provided subsequently, according to design choice. Upon retirement of the store instruction, the data is stored into D-cache 44 (although there may be some delay between retirement and update of D-cache 44). Additionally, load/store unit 42 may include a load/store buffer for storing load/store addresses which miss D-cache 44 for subsequent cache fills (via external interface unit 46) and re-attempting the missing load/store operations. Load/store unit 42 is further configured to handle load/store memory dependencies.

D-cache 44 is a high speed cache memory for storing data accessed by processor 10. While D-cache 44 may comprise any suitable structure (including direct mapped and set-associative structures), one embodiment of D-cache 44 may comprise a 128 Kbyte, 2 way set associative cache having 64 byte lines.

External interface unit 46 is configured to communicate to other devices via external interface 52. Any suitable external interface 52 may be used, including interfaces to L2 caches and an external bus or buses for connecting processor 10 to other devices. External interface unit 46 fetches fills for I-cache 16 and D-cache 44, as well as writing discarded updated cache lines from D-cache 44 to the external interface. Furthermore, external interface unit 46 may perform non-cacheable reads and writes generated by processor 10 as well.

Figure 2:
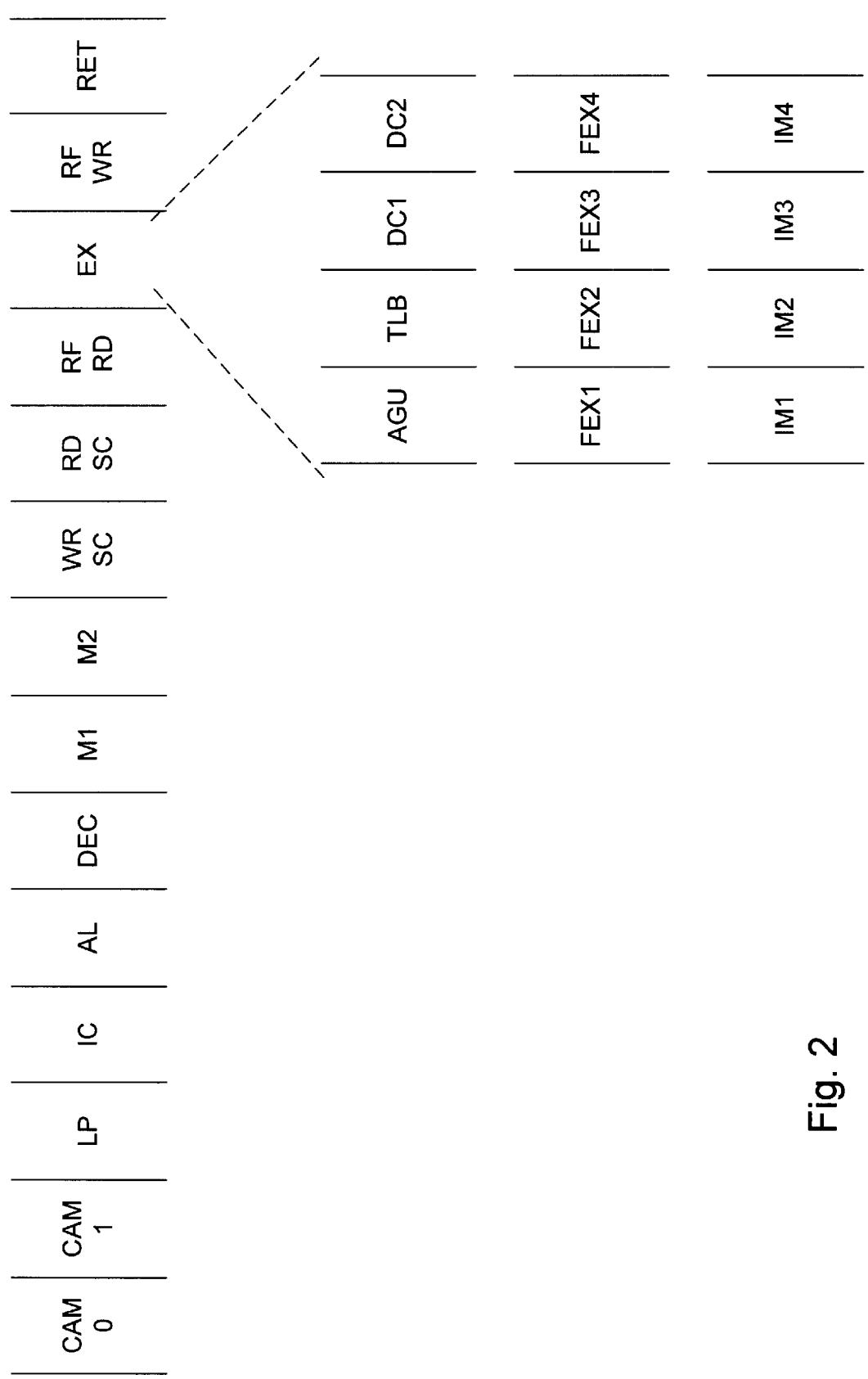
FIG. 2 is a pipeline diagram illustrating one embodiment of a pipeline which may be employed by the processor shown in FIG. 1.

Turning next to FIG. 2, an exemplary pipeline diagram illustrating an exemplary set of pipeline stages which may be employed by one embodiment of processor 10 is shown. Other embodiments may employ different pipelines, pipelines including more or fewer pipeline stages than the pipeline shown in FIG. 2. The stages shown in FIG. 2 are delimited by vertical dashed lines. Each stage is one clock cycle of a clock signal used to clock storage elements (e.g. registers, latches, flops, and the like) within processor 10.

As illustrated in FIG. 2, the exemplary pipeline includes a CAM0 stage, a CAM1 stage, a line predictor (LP) stage, an instruction cache (IC) stage, an alignment (AL) stage, a decode (DEC) stage, a map1 (M1) stage, a map2 (M2) stage, a write scheduler (WR SC) stage, a read scheduler (RD SC) stage, a register file read (RF RD) stage, an execute (EX) stage, a register file write (RF WR) stage, and a retire (RET) stage. Some instructions utilize multiple clock cycles in the execute state. For example, memory operations, floating point operations, and integer multiply operations are illustrated in exploded form in FIG. 2. Memory operations include an address generation (AGU) stage, a translation (TLB) stage, a data cache 1 (DC 1) stage, and a data cache 2 (DC2) stage. Similarly, floating point operations include up to four floating point execute (FEX1–FEX4) stages, and integer multiplies include up to four (IM1–IM4) stages.

During the CAM0 and CAM1 stages, line predictor 12 compares the fetch address provided by branch prediction/fetch PC generation unit 18 to the addresses of lines stored therein. Additionally, the fetch address is translated from a virtual address (e.g. a linear address in the x86 architecture) to a physical address during the CAM0 and CAM1 stages. In response to detecting a hit during the CAM0 and CAM1 stages, the corresponding line information is read from the line predictor during the line predictor stage. Also, I-cache 14 initiates a read (using the physical address) during the line predictor stage. The read completes during the instruction cache stage.

It is noted that, while the pipeline illustrated in FIG. 2 employs two clock cycles to detect a hit in line predictor 12 for a fetch address, other embodiments may employ a single clock cycle (and stage) to perform this operation. Moreover, in one embodiment, line predictor 12 provides a next fetch address for I-cache 14 and a next entry in line predictor 12 for a hit, and therefore the CAM0 and CAM1 stages may be skipped for fetches resulting from a previous hit in line predictor 12.

Instruction bytes provided by I-cache 14 are aligned to decode units 24A–24D by alignment unit 16 during the alignment stage in response to the corresponding line information from line predictor 12. Decode units 24A–24D decode the provided instructions, identifying ROPs corresponding to the instructions as well as operand information during the decode stage. Map unit 30 generates ROPs from the provided information during the map1 stage, and performs register renaming (updating future file 20). During the map2 stage, the ROPs and assigned renames are recorded in retire queue 32. Furthermore, the ROPs upon which each ROP is dependent are determined. Each ROP may be register dependent upon earlier ROPs as recorded in the future file, and may also exhibit other types of dependencies (e.g. dependencies on a previous serializing instruction, etc.)

The generated ROPs are written into scheduler 36 during the write scheduler stage. Up until this stage, the ROPs located by a particular line of information flow through the pipeline as a unit. However, subsequent to be written into scheduler 36, the ROPs may flow independently through the remaining stages, at different times Generally, a particular ROP remains at this stage until selected for execution by scheduler 36 (e.g. after the ROPs upon which the particular ROP is dependent have been selected for execution, as described above). Accordingly, a particular ROP may experience one or more clock cycles of delay between the write scheduler write stage and the read scheduler stage. During the read scheduler stage, the particular ROP participates in the selection logic within scheduler 36, is selected for execution, and is read from scheduler 36. The particular ROP then proceeds to read register file operations from one of register files 38A–38B (depending upon the type of ROP) in the register file read stage.

The particular ROP and operands are provided to the corresponding execution core 40A or 40B, and the instruction operation is performed on the operands during the execution stage. As mentioned above, some ROPs have several pipeline stages of execution. For example, memory instruction operations (e.g. loads and stores) are executed through an address generation stage (in which the data address of the memory location accessed by the memory instruction operation is generated), a translation stage (in which the virtual data address provided by the address generation stage is translated) and a pair of data cache stages in which D-cache 44 is accessed. Floating point operations may employ up to 4 clock cycles of execution, and integer multiplies may similarly employ up to 4 clock cycles of execution.

Upon completing the execution stage or stages, the particular ROP updates its assigned physical register during the register file write stage. Finally, the particular ROP is retired after each previous ROP is retired (in the retire stage). Again, one or more clock cycles may elapse for a particular ROP between the register file write stage and the retire stage. Furthermore, a particular ROP may be stalled at any stage due to pipeline stall conditions, as is well known in the art.

Cache Access

Figure 3:
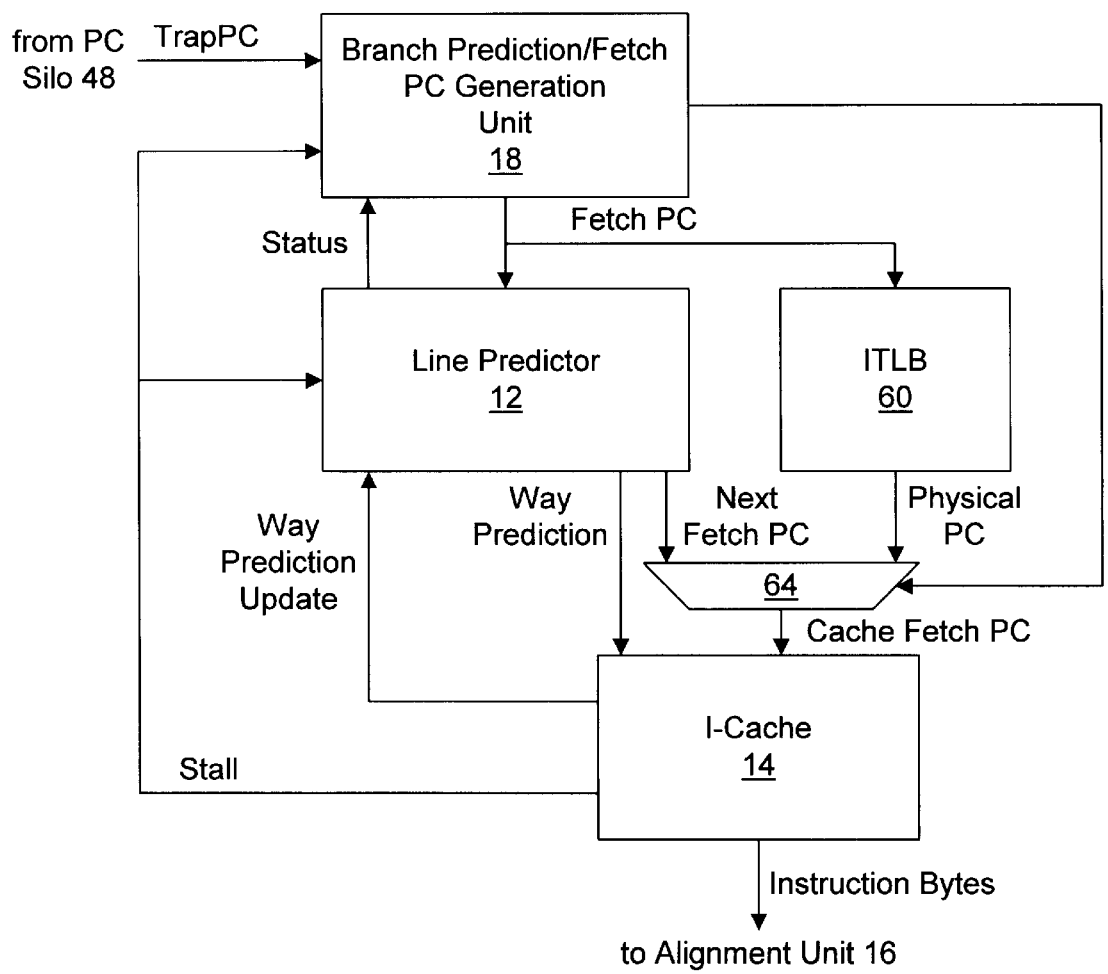
FIG. 3 is a block diagram of a branch prediction/fetch PC generation unit, line predictor, and I-cache shown in FIG. 1 and an ITLB illustrating interconnection therebetween according to one embodiment of the units.

Turning now to FIG. 3, a block diagram illustrating one embodiment of branch prediction/fetch PC generation unit 18, line predictor 12, I-cache 14, an instruction TLB (ITLB) 60, and a fetch address mux 64 is shown. Other embodiments are possible and contemplated. In the embodiment of FIG. 3, branch prediction/fetch PC generation unit 18 is coupled to receive a trap PC from PC silo 48, and is further coupled to ITLB 60, line predictor 12, I-cache 14, and fetch address mux 64. ITLB 60 is further coupled to fetch address mux 64, which is coupled to I-cache 14. Line predictor 12 is coupled to I-cache 14, and fetch address mux 64.

Generally, branch prediction/fetch PC generation unit 18 generates a fetch address (fetch PC) for instructions to be fetched. The fetch address is provided to line predictor 12 and TLB 60 (as well as PC silo 48, as shown in FIG. 1). Line predictor 12 compares the fetch address to fetch addresses stored therein to determine if a line predictor entry corresponding to the fetch address exists within line predictor 12.

If a corresponding line predictor entry is found, the instruction pointers stored in the line predictor entry are provided to alignment unit 16. In parallel with line predictor 12 searching the line predictor entries, ITLB 60 translates the fetch address (which is a virtual address in the present embodiment) to a physical address (physical PC) for access to I-cache 14. ITLB 60 provides the physical address to fetch address mux 64, and branch prediction/fetch PC generation unit 18D controls mux 64 to select the physical address. The output of mux 64 is referred to as the cache fetch address (or cache fetch PC) for clarity in the drawings and description. I-cache 14 reads instruction bytes corresponding to the physical address and provides the instruction bytes to alignment unit 16.

In the present embodiment, each line predictor entry also provides a next fetch address (next fetch PC). The next fetch address is provided to mux 64, and branch prediction/fetch PC generation unit 18 selects the address through mux 64 as the cache fetch address to access I-cache 14 in response to line predictor 12 detecting a hit. In this manner, the next fetch address may be more rapidly provided to I-cache 14 as long as the fetch addresses continue to hit in the line predictor. The line predictor entry may also include an indication of the next line predictor entry within line predictor 12 (corresponding to the next fetch address) to allow line predictor 12 to fetch instruction pointers corresponding to the next fetch address. Accordingly, as long as fetch addresses continue to hit in line predictor 12, fetching of lines of instructions may be initiated from the line predictor stage of the pipeline shown in FIG. 2. Traps initiated by PC silo 48 (in response to scheduler 36), a disagreement between the prediction made by line predictor 12 for the next fetch address and the next fetch address generated by branch prediction/fetch PC generation unit 18 may cause the fetch address generated by branch prediction/fetch PC generation unit 18 to be searched in line predictor 12.

Additionally, line predictor 12 provides a way prediction corresponding to the cache fetch address. I-cache 14 may read the predicted way identified by the way prediction and provide the read instruction bytes to alignment unit 16. Advantageously, the latency for accessing I-cache 14 may be reduced since the tag comparisons are not used to select output data. Furthermore, power consumption may be reduced by idling the non-predicted ways (i.e. not accessing the non-predicted ways), and thus the power that would be consumed by accessing the non-predicted ways is conserved. Still further, I-cache 14 may access the tag from the predicted way and partial tags from the nonpredicted ways. The partial tags exclude one or more bits of the full tag, and may be used to direct the search of the non-predicted ways if the fetch address misses in the predicted way. Still additional power may be conserved by accessing the full tag from the predicted way but only partial tags from the non-predicted ways. If the fetch address misses the predicted way, I-cache 14 may search the non-predicted ways for which the corresponding partial tag matches the corresponding portion of the fetch address. If the partial tag does not match the corresponding portion of the fetch address, then the full tag will not match either and thus the way for which a partial tag does not match may be skipped in the search. Accordingly, the search may be more efficient while still allowing power consumption to be reduced as compared to accessing the full tag from each way.

If a way prediction miss is detected, I-cache 14 may assert a stall signal to branch prediction/fetch PC generation unit 18 and line predictor 12. The stall signal may cause branch prediction/fetch PC generation unit 18 and line predictor 12 to interrupt further generation of fetch addresses to allow I-cache 14 to search for a hit in the non-predicted ways. Once a hit is detected, I-cache 14 may provide an updated way prediction to line predictor 12 and deassert the stall signal. Line predictor 12 may update the corresponding line predictor entry with the updated way prediction. If a miss is detected (i.e. none of the ways have a matching tag), then I-cache 14 may select a replacement way and provide the replacement way as an updated way prediction. Alternatively, the replacement way may be selected when the corresponding instruction bytes are provided to I-cache 14 from external interface unit 46.

Even while next fetch addresses are being generated by line predictor 12 and are hitting in line predictor 12, branch prediction/fetch PC generation unit 18 continues to generate fetch addresses for logging by PC silo 48. Furthermore, branch prediction/fetch PC generation unit 18 may verify the next fetch addresses provided by line predictor 12 via one or more branch predictors included therein. The line predictor entries within line predictor 12 identify the terminating instruction within the line of instructions by type, and line predictor 12 transmits the type information to branch prediction/fetch PC generation unit 18 as well as the predicted direction of the terminating instruction (status in FIG. 3). Furthermore, for branches forming a target address via a branch displacement included within the branch instruction, line predictor 12 may provide an indication of the branch displacement. From this information and information stored in the branch predictors, branch prediction/fetch PC generation unit 18 may generate the virtual next fetch addresses. In one embodiment, the branch predictors include a conditional branch predictor, an indirect branch target address cache, and a return stack.

It is noted that, in one embodiment, I-cache 14 may provide a fixed number of instruction bytes per instruction fetch, beginning with the instruction byte located by the fetch address. Since a fetch address may locate a byte anywhere within a cache line, I-cache 14 may access two cache lines in response to the fetch address (the cache line indexed by the fetch address, and a cache line at the next index in the cache). Other embodiments may limit the number of instruction bytes provided to up to a fixed number or the end of the cache line, whichever comes first. In one embodiment, the fixed number is 16 although other embodiments may use a fixed number greater or less than 16. In embodiments which access two cache lines, two way predictions may be provided. The discussion below with respect to FIGS. 4–9 may refer to a way prediction, but may be extended to multiple concurrent way predictions.

As used herein, an "address" is a value which identifies a byte within a memory system to which processor 10 is couplable. A "fetch address" is an address used to fetch instruction bytes to be executed as instructions within processor 10. As mentioned above, processor 10 may employ an address translation mechanism in which virtual addresses (generated in response to the operands of instructions) are translated to physical addresses (which physically identify locations in the memory system). In the x86 instruction set architecture, virtual addresses may be linear addresses generated according to a segmentation mechanism operating upon logical addresses generated from operands of the instructions. Other instruction set architectures may define the virtual address differently.

Figure 4:
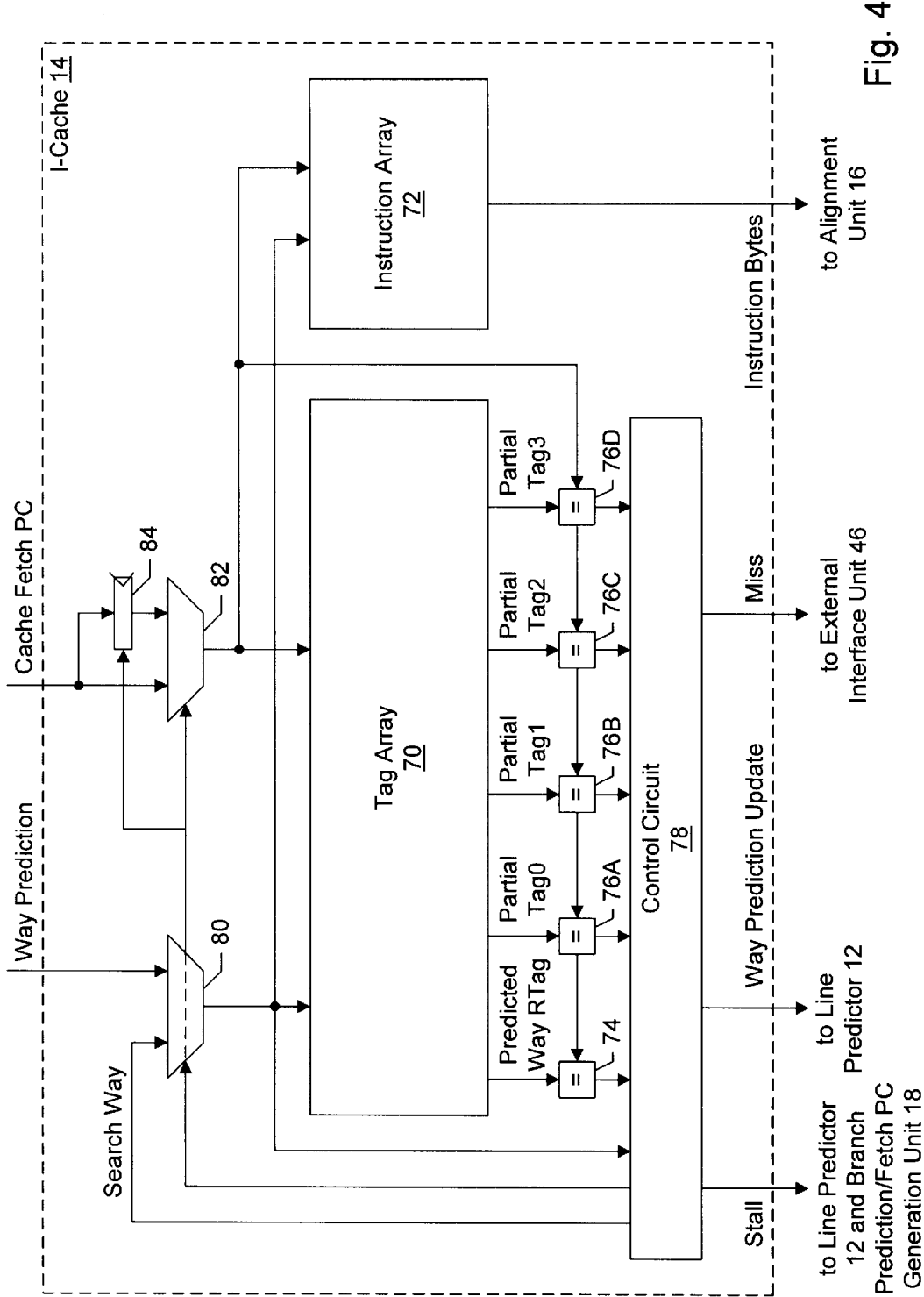
FIG. 4 is a block diagram of one embodiment of an I-cache shown in FIGS. 1 and 3.

Turning now to FIG. 4, a block diagram of one embodiment of I-cache 14 is shown. Other embodiments are possible and contemplated. In the embodiment of FIG. 4, I-cache 14 includes a tag array 70, an instruction array 72, a remaining tag comparator 74, a plurality of partial tag comparators 76A–76D, a control circuit 78, a way multiplexor (mux) 80, an address mux 82, and an address register 84. Address mux 82 and address register 84 are coupled to receive the cache fetch address provided to I-cache 14, and address register 84 is further coupled to address mux 82. The output of address mux 82 is coupled to tag array 70 and instruction array 72, as well as to comparators 74 and 76A–76D. Way mux 80 is coupled to receive the way prediction provided to I-cache 14 and is coupled to receive a search way selection from control circuit 78. The output of way-mux 80 is coupled to tag array 70 and instruction array 72. Muxes 80 and 82 are coupled to receive selection signals from control circuit 78, and address register 84 is coupled to receive a hold control signal from control circuit 78. Remaining tag comparator 74 is coupled to receive a predicted way remaining tag (RTag) from tag array 70 and is coupled to provide an output signal to control circuit 78. Each of partial tag comparators 76A–76D are coupled to receive respective partial tags (PTag0–PTag3) from tag array 70 and are coupled to provide respective output signals to control circuit 78. Control circuit 78 is coupled to provide a miss signal to external interface unit 46, a way prediction update signal to line predictor 12, and a stall signal to line predictor 12 and branch prediction/fetch PC generation unit 18. Control circuit 78 is coupled to receive the way selection from way mux 80. It is noted that I-cache 14 may include additional circuitry (not shown) to manage the transfer of cache lines into I-cache 14 in response to misses, to manage snoop transactions, etc., as desired.

Tag array 70 stores the tags of the cache lines of instruction bytes which are stored in I-cache 14, and instruction array 72 stores the cache lines of instruction bytes. Tag array 70 and instruction array 72 may, for example, comprise random access memory (RAM) arrays. There is a one-to-one correspondence between tag storage locations in tag array 70 and cache line storage locations in instruction array 72. More particularly, tag array 70 and instruction array 72 may include the same number of sets (and thus be indexed by the same set of index bits) and the same number of ways.

Generally, while control circuit 78 is not searching for a hit of a fetch address in a non-predicted way due to a miss in the predicted way, control circuit 78 selects the cache fetch address through address mux 82 and the way prediction through way mux 80. Accordingly, the cache fetch address and predicted way are provided to tag array 70 and instruction array 72. More particularly, the index portion of the cache fetch address is provided to each array, and the corresponding set is selected. Furthermore, in instruction array 72, the predicted way of the set is accessed and the non-predicted ways are held idle to conserve power (in response to the way prediction). Since the power consumed by an array during a read access is generally proportional to the amount of information accessed (e.g. the number of bits or bytes), the power consumed is reduced by idling portions of the array that would otherwise be accessed and then not selected at the output (e.g. the non-predicted ways of instruction array 72). The instruction bytes stored in the predicted way are output from instruction array 72 to alignment unit 16. Additionally, a partial tag is read from each way of tag array 70, and the remaining tag (i.e. the portion of the tag which is excluded from the partial tag) is read from the predicted way of tag array 70. Again, since only partial tags are read from the non-predicted ways, power may be conserved as compared to reading the complete tag from each way. The combination of the partial tag from the predicted way and the remaining tag from the predicted way comprises the tag from the predicted way.

Remaining tag comparator 74 compares the remaining tag from the predicted way to a corresponding portion of the fetch address. If the remaining tag and corresponding portion of the fetch address are equal, remaining tag comparator 74 asserts its output signal to control circuit 78. Otherwise, remaining tag comparator 74 deasserts its output signal to control circuit 78. Similarly, each of partial tag comparators 76A–76D receives a partial tag from a respective way of tag array 70 and compares the received partial tag to the corresponding portion of the fetch address. If the received partial tag and corresponding portion of the fetch address are equal, the partial tag comparator 76A–76D asserts its output signal. Otherwise, the partial tag comparator 76A–76D deasserts its output signal.

If remaining tag comparator 74 and the partial tag comparator 76A–76D corresponding to the predicted way both assert their output signals, then control circuit 78 detects a hit in the predicted way and the corresponding instruction bytes provided by instruction array 72 are correct. Control circuit 78 does not assert the stall signal or the miss signal, and subsequent accesses may continue. Control circuit 78 receives the way selection provided to tag array 70 to determine which of the partial tag comparators 76A–76D corresponds to the selected way.

On the other hand, if either the remaining tag comparator 74 or the partial tag comparator 76A–76D corresponding to the predicted way does not assert its output signal, control circuit 78 detects a miss in the predicted way. If none of the other partial tag comparators 76A–76D asserts its output signal, then the fetch address is a miss in I-cache 14 and control circuit 78 asserts the miss signal to external interface unit 46 to cause the missing instruction bytes to be fetched. Conversely, if at least one of the output signals from the other partial tag comparators 76A–76D is asserted and a miss in the predicted way is detected, control circuit 78 generates a search way selection, provides the search way selection to way mux 80, and asserts the stall signal to line predictor 12 and branch prediction/fetch PC generation unit 18. The search way selection identifies a way for which the partial tag matches the corresponding portion of the fetch address. Control circuit 78 selects the search way selection through way mux 80 and the value in address register 84 through address mux 84. The search way is accessed, and comparisons to determine if a hit is detected in the search way are preformed in a manner similar to the predicted way access. If a hit is detected, control circuit 78 transmits the search way selection which hits as the way prediction update to line predictor 12.

Generally, address register 84 captures the cache fetch address provided to I-cache 14 each clock cycle. However, address register 84 includes a hold control which, when asserted, causes address register 84 to hold its current value. The hold control is asserted during clock cycles in which control circuit 78 is selecting the search way selection through way mux 80 and the contents of address register 84 through address mux 82. In this manner, the fetch address which missed in the predicted way is presented again to tag array 70 and instruction array 72, and the search way selection is provided as the way selection to tag array 70 and instruction array 72.

If control circuit 78 does not detect a hit in the search way, control circuit 78 generates additional search ways until each way for which a partial tag hit is detected has been searched. In one embodiment, the first search way may be the lowest numbered way for which a partial tag hit is detected, and the subsequent search ways may be generated in increasing order (e.g. way 0 is searched first, and way 3 is searched last, in the present embodiment). Control circuit 78 continues to assert the stall signal as the search continues. If each of the ways having partial tag hits have been searched for a hit and no hit has been detected, control circuit 78 asserts the miss signal to external interface unit 46. Accordingly, the missing cache line may be fetched and stored into I-cache 14. The assertion of the miss signal may cause line predictor 12 and branch prediction/fetch PC generation unit 18 to stall until the missing instruction bytes are provided from external interface unit 46. Alternatively, control circuit 78 may continue to assert the stall signal until the missing instruction bytes are provided.

It is noted that, in addition to accessing only the selected way in instruction array 72, instruction array 72 may employ multiple banks within a cache line. Instruction array 72 may use one or more cache line offset bits to select a bank (or banks) to access, and the other banks may be held idle. It is further noted that a portion of an array may be held idle by not accessing that portion of the array. For example, the portion may be idle if no storage cells are selected from the portion to output data from the array. In other words, the idled portions may not be "powered up". It is further noted that, while an instruction cache is used as an example of the use of way prediction and partial tags, other caches may employ similar structures. For example, a data cache or combined instruction/data cache may employ a similar structure.

It is noted that alternative configurations are possible. For example, instead of searching each of the ways for which a partial hit is detected, tag array 70 may be configured to provide a full tag read from each way in addition to reading a full tag from a selected way and partial tags from the other ways. If one or more partial tag hits are detected, control circuit 78 may perform the full tag read and full tag comparators may be provided for each way. In this manner, the search for a hit may be completed in one read of the tags, rather than one or more reads as described above. It is further noted that address mux 82 and mux 64 (shown in FIG. 3) may be merged, if desired, into a single mux to select between address register 84, the physical address provided by ITLB 60, and the next fetch address provided by line predictor 12.

Figure 5:
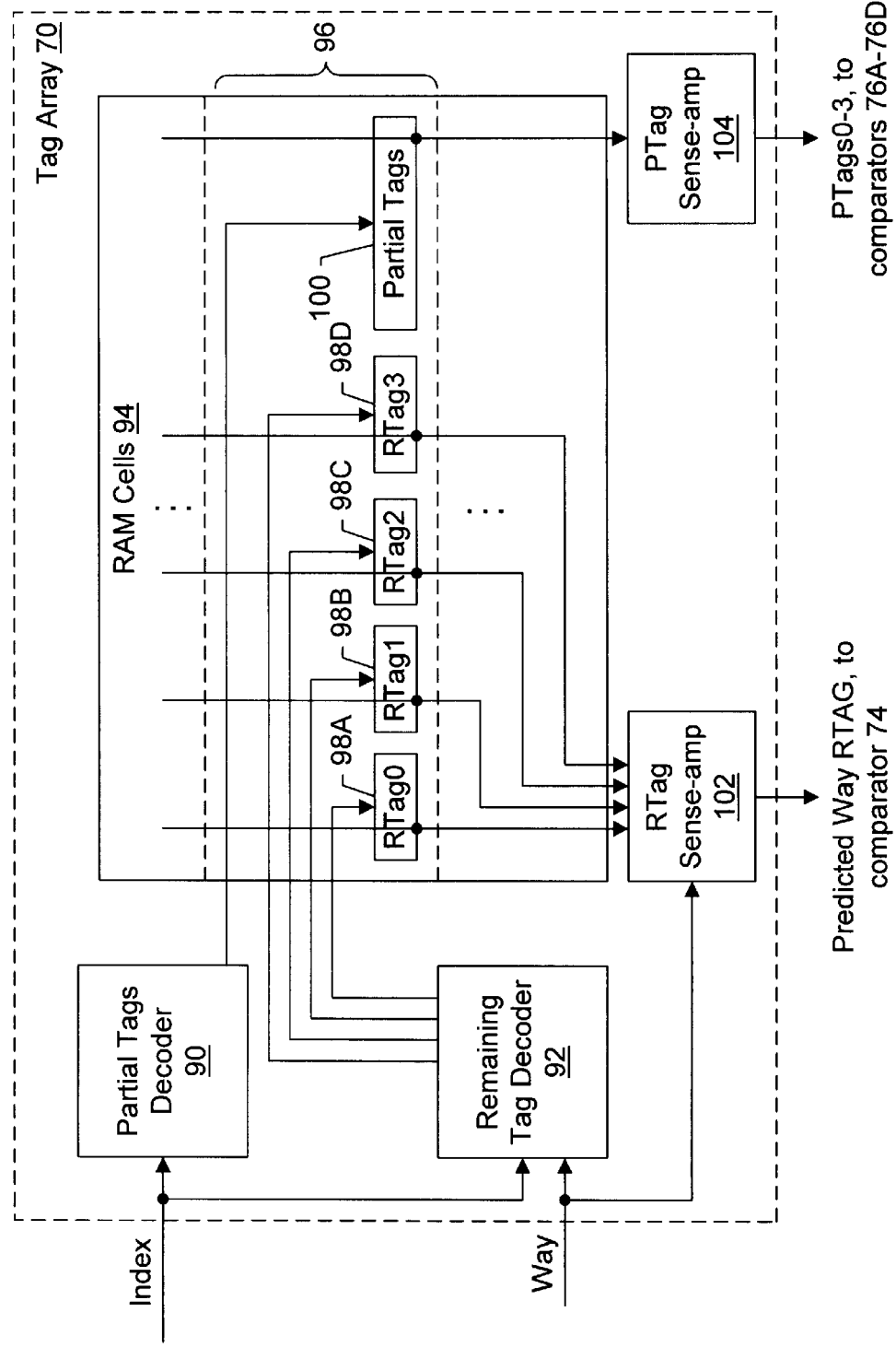
FIG. 5 is a block diagram of one embodiment of a tag array shown in FIG. 4.

Turning next to FIG. 5, a block diagram of one embodiment of tag array 70 is shown. Other embodiments are possible and contemplated. In the embodiment of FIG. 5, tag array 70 includes a partial tags decoder 90 coupled to receive an index and a remaining tag decoder 92 coupled to receive the index and a way selection. Tag array 70 further includes a set of RAM cells 94 arranged into sets. An exemplary set 96 is illustrated between two horizontal dashed lines, and other sets may include an identical configuration receiving different signals from decoders 90 and 92. Set 96 includes remaining tags cells 98A–98D and partial tags cells 100. A remaining tags sense amplifier (senseamp) 102 and a partial tags senseamp 104 are shown as well. It is noted that additional circuitry may be included to update tag array 70 (not shown) in any manner suitable for set associative RAM designs.

In a typical RAM array, a decoder decodes the received index to select a set and activates a word line to the RAM cells within the set. Each RAM cell is coupled to a pair of bit lines (commonly referred to as bit and bit bar), one of which the RAM cell discharges in response to the bit stored in the RAM cell. A senseamp is coupled to the bit lines and is configured to produce a binary zero or binary one for each cell in the set in response to the differential voltage between the pair of bit lines. In the embodiment of tag array 70 illustrated in FIG. 5, cells 98A–98D and cells 100 are coupled to pairs of bits lines for each cell, represented by vertical lines coupling the cells to one of senseamps 102 or 104. Thus, for each bit in cells 98A, a pair of bit lines may be provided and coupled to remaining tags senseamp 102. Similarly, for each bit in cells 98B, a pair of bit lines may be provided coupled to remaining tags senseamp 102 (and similarly for cells 98C–98D). A pair of bit lines may be provided for each bit in cells 100, coupled to partial tags senseamp 104. The cells 98A–98D and 100 in other sets (not shown in FIG. 5) are coupled to the same sets of bit lines as the cells 98A–98D and 100, respectively.

Generally, partial tags cells 100 store the partial tags portion of each tag stored in set 96. For example, in the illustrated embodiment, tag array 70 is 4 way set associative. Thus, partial tags cells 100 includes cells to store each bit of four partial tags (one for each way) for such an embodiment. Each of remaining tags cells 98A–98D includes cells to store each bit of one remaining tag (and thus four tags cells 98A–98D are illustrated for the present four way set associative embodiment).

Partial tags decoder 90 decodes the index received by the tag array and activates a partial tags word line for the selected set. Each set receives a different word line from partial tags decoder 90. For example, FIG. 5 illustrates partial tags 100 in set 96 receiving a word line from partial tags decoder 90. In response to the activated word line, the partial tags cells 100 discharge the bit lines coupled thereto and partial tags senseamp 104 senses the bits of the partial tags via the differential voltages on the bit lines. In this manner, the partial tags from each way are output to comparators 76A–76D. It is noted that the word line for the partial tags may actually comprise separate word lines for each way, to allow one partial tags portion to be updated while leaving the remaining partial tags unchanged. For read purposes, each of the word lines is activated to read each of the partial tags.

Remaining tag decoder 92 decodes the index to determine the selected set, and also decodes the way selection to select one of the remaining tags stored in the selected set. Remaining tag decoder 92 provides a plurality of word lines to each set, and activates one of the word lines for the selected set in response to the way selection. For example, FIG. 5 illustrates remaining tag decoder 92 providing a first word line to remaining tags cells 98A, a second word line to remaining tags cells 98B, a third word line to remaining tags cells 98C, and a fourth word line to remaining tags cells 98D. Other sets receive different plurality of word lines. In response to an activated word line, one of remaining tags cells 98A–98D discharges the corresponding bit lines and remaining tag senseamp 102 senses the bits of the remaining tag via the differential voltages. In this manner, the remaining tag from the selected way is output to comparator 74. It is noted that, in the illustrated embodiment, remaining tag senseamp 102 provides one remaining tag from the several remaining tags in the set. Thus, remaining tag senseamp 102 receives the way selection (or, alternatively, control signals from remaining tag decoder 92) to select one set of bit lines corresponding to one of the remaining tags cells 98A–98D to sense. In other words, the bit lines from each of remaining tags cells 98A–98D may be "column-muxed" prior to being input to the senseamp circuitry. Since senseamps typically consume substantial amounts of the power consumed by an array, limiting the number of bit lines sensed may further reduce power. Alternatively, the remaining tags may be muxed after being sensed by separate senseamps, as desired.

In an alternative configuration, tag array 70 may employ a single decoder and a single word line per set, but may provide one remaining tag senseamp 102 and column mux as described above. In such and embodiment, each remaining tags cells 98A–98D in the selected set discharges its corresponding bit lines, but the number of bit lines sensed is still limited and thus the power consumed by the senseamp may be limited. Furthermore, in an embodiment which provides for a full tag read, tag array 70 may employ senseamps for each bit stored in a set but may only activate the partial tags senseamps and one of the remaining tags senseamps unless a full tag read is performed.

It is noted that the distribution of cells within a set as shown in FIG. 5 is for convenience and clarity in the drawing only. The cells may be physically arranged in any suitable manner according to design choice.

Figure 6:
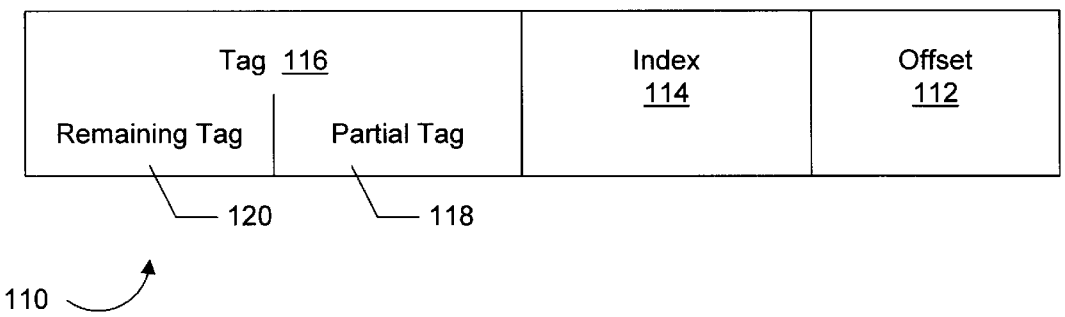
FIG. 6 is a diagram illustrating fields within an exemplary address.

Turning now to FIG. 6, an exemplary fetch address 110 is shown illustrating the various portions of the fetch address as they relate to I-cache 14. The most significant bits of the fetch address are to the left in FIG. 6, and the least significant bits are to the right in FIG. 6. As shown in FIG. 6, fetch address 110 is divided into an offset field 112, an index field 114, and a tag field 116. Tag field 116 is subdivided into a partial tag field 118 and a remaining tag field 120.

The portion of fetch address 110 forming offset field 112 are the bits of fetch address 110 which define the offset of the addressed byte within the instruction cache line. Accordingly, the number of bits within offset field 112 is dependent upon the number of bytes within the cache line. For example, in one embodiment I-cache 14 comprises a 64 byte cache line. For such an embodiment, offset field 112 is the least significant six bits of the cache line.

The index field 114 includes the bits which form the cache index to select the set in I-cache 14. In the embodiment shown, index field 114 comprises the least significant bits of fetch address 110 exclusive of offset field 112. For example, in one embodiment, I-cache 14 is 128 Kbytes in a four way set associative structure with 64 byte lines. Such an embodiment has 512 sets, and thus the index comprises 9 bits to provide for selection of a set ($2^9$=512).

Tag field 116 comprises the portion of fetch address 110 exclusive of the index field 114 and the offset field 112. Tag field 116 comprises the portion of fetch address 110 which is stored by I-cache 14 to uniquely identify a cache line in tag array 70 (and is referred to as the "tag"). Since offset field 112 defines a byte within the cache line, the offset field 112 is not stored. Furthermore, since the index selects the set within I-cache 14, the index is inherent in the location of I-cache 14 storing the tag. Therefore, comparing the tag field 116 to the tags stored in the selected set identifies a cache line corresponding to the fetch address as being stored in I-cache 14 (if a match is detected).

Partial tag field 118 is, in the illustrated embodiment, the portion of tag field 116 provided by tag array 70 for each way to determine which ways to search for a hit if the predicted way misses, and is the portion of the fetch address provided to partial tag comparators 76A–76D for comparison to the partial tags provided by tag array 70. In the illustrated embodiment, partial tag field 118 comprises the least significant bits of tag field 116. Since many programs exhibit "locality of reference" in which the instructions are physically located in memory near each other, and since I-cache 14 typically stores the most recently accessed cache lines of instruction bytes, the bits of the tag which may be statistically most likely to be different from the fetch address are the least significant bits of the tag. Accordingly, these bits are selected as the partial tag field 118 to increase the likelihood of limiting the search of non-predicted ways, thus more quickly locating the hitting way or detecting a miss. Other embodiments may select any suitable portion of tag field 116 to form the partial tag.

Remaining tag field 120 is, in the illustrated embodiment, the portion of the tag field 116 provided by tag array 70 for the predicted or selected way to determine if a hit in the way is detected, and is the portion of the fetch address provided to remaining tag comparator 74 for comparison to the remaining tag provided by tag array 70. Remaining tag field 120 comprises the remaining bits of tag field 116 exclusive of the partial tag field 118.

The number of bits included in partial tag field 118 may be selected according to design choice. Generally, the number of bits selected may be a tradeoff between the accuracy with which ways are eliminated or included in the search and the amount of power conserved. The larger the number of bits included in the partial tag, the more likely a way storing a non-matching tag will be eliminated from the search for a hit in a non-predicted way, but the less power will be conserved. For example, in an embodiment having a four way set associative cache, one third of the bits in tag field 116 may be allocated to partial tag field 118 while consuming approximately half the power of a full tag read (since one full tag three partial tags, each one third the size of the full tag, are read, equaling two full tags). Any number of bits may be included in the partial tag. Generally, a partial tag excludes at least one bit, and may exclude multiple bits, of the tag.

Figure 7:
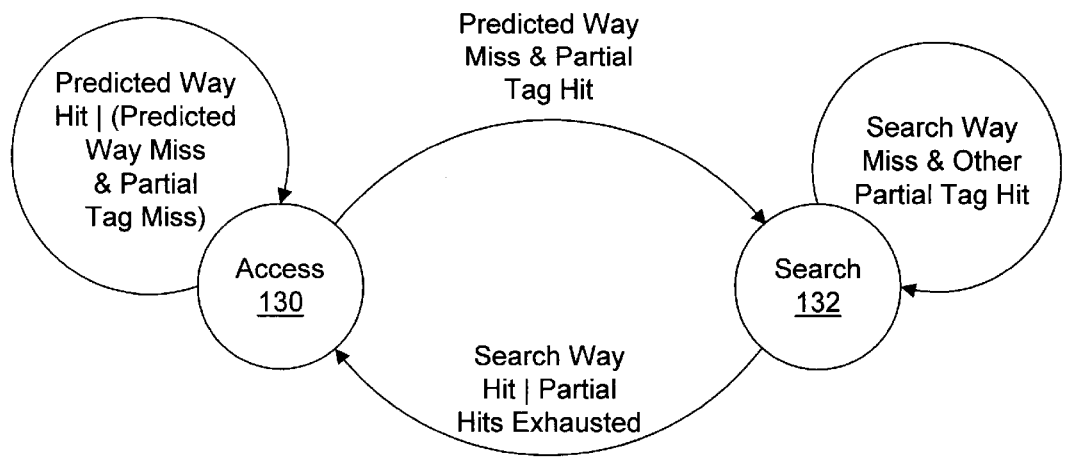
FIG. 7 is a state machine diagram illustrating a state machine which may be employed by one embodiment of a control circuit shown in FIG. 4.

Turning next to FIG. 7, an exemplary state machine is shown which may be employed by one embodiment of control circuit 78. Other embodiments are possible and contemplated. In the embodiment of FIG. 7, the state machine includes an access state 130 and a search state 132.

Access state 130 is the state in which normal fetches from I-cache 14 are performed. Accordingly, the state machine remains in access state 130 if a fetch hits in the predicted way. Additionally, the state machine remains in access state 130 if a fetch misses in the predicted way but also is a miss when compared to the partial tags (i.e. none of the partial tags match the corresponding portion of the fetch address). On the other hand, the state machine transitions from access state 130 to search state 132 in response to a fetch which misses in the predicted way and at least one of the partial tags matches the corresponding portion of the fetch address (a "partial tag hit").

Search state 132 is the state in which I-cache 14 searches the non-predicted ways which have a partial tag hit for a fetch address which missed the predicted way. The state machine remains in search state 132 if the fetch address misses the search way of the current search and at least one other way having a partial tag hit is to be searched. The state machine transitions from search state 132 to access state 130 if the search way hits or if each of the partial tag hits is exhausted (i.e. has been searched and found to miss).

Figure 8:
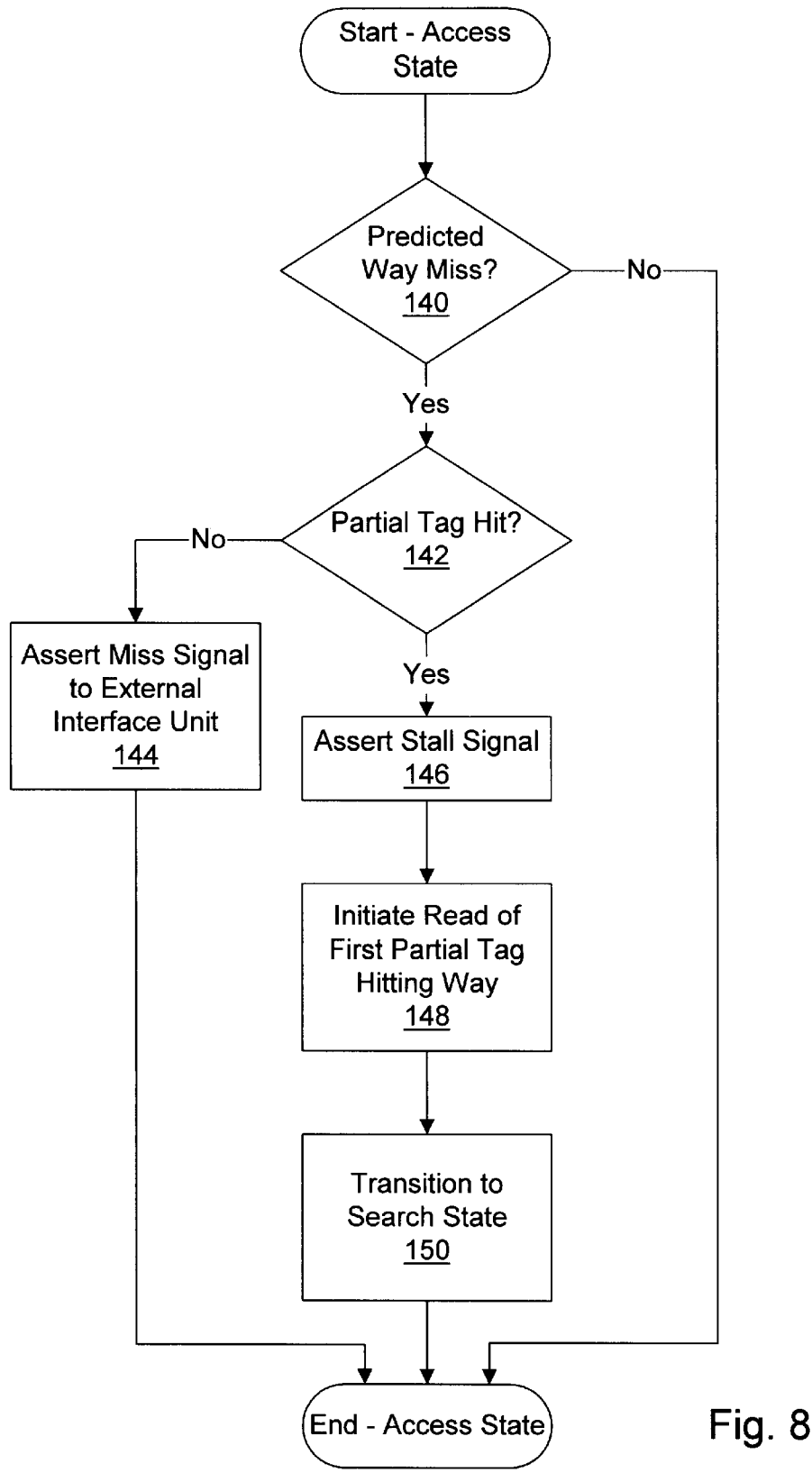
FIG. 8 is a flowchart illustration operation of one embodiment of the control circuit shown in FIG. 4 in an access state shown in FIG. 7.

Turning next to FIG. 8, a flowchart is shown illustrating operation of one embodiment of control circuit 78 while the state machine is in access state 130. Other embodiments are possible and contemplated. While steps are shown in FIG. 8 in a particular order for ease of understanding, any suitable order may be used. Furthermore, steps may be performed in parallel by the combinatorial logic employed within control circuit 78.

If a fetch address is presented, control circuit 78 determines if the fetch address misses in the predicted way (decision block 140). For example, control circuit 78 examines the output signals from remaining tag comparator 74 and the partial tag comparator 76A–76D corresponding to the predicted way. If the fetch address hits in the predicted way, control circuit 78 does nothing additional. On the other hand, if the fetch address misses in the predicted way, control circuit 78 determines if there is a partial tag hit (decision block 142). For example, control circuit 78 may determine if there is a partial tag hit by examining the output signals from each other partial tag comparator 76A–76D. If no partial tag hit is detected, control circuit 78 asserts the miss signal to external interface unit 46 to initiate a fetch of the missing cache line (step 144). On the other hand, if a partial tag hit is detected, control circuit 78 asserts the stall signal (step 146). Additionally, control circuit 78 initiates a read of a first way for which a corresponding partial tag hits the fetch address (step 148). Control circuit 78 then transitions the state machine to the search state (step 150).

Figure 9:
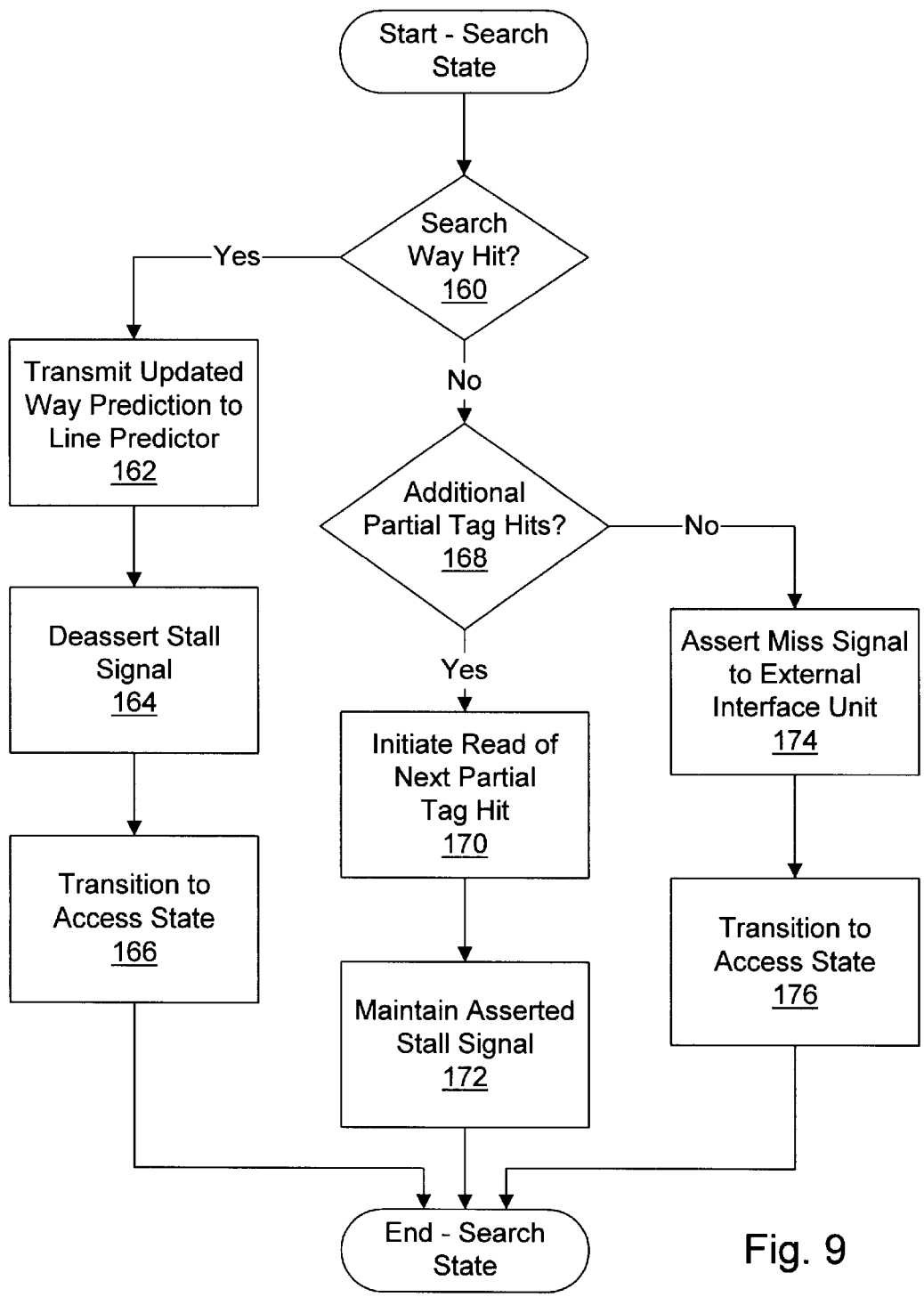
FIG. 9 is a flowchart illustration operation of one embodiment of the control circuit shown in FIG. 4 in a search state shown in FIG. 7.

FIG. 9 is a flowchart illustrating operation of one embodiment of control circuit 78 while the state machine is in search state 132. Other embodiments are possible and contemplated. While steps are shown in FIG. 9 in a particular order for ease of understanding, any suitable order may be used. Furthermore, steps may be performed in parallel by the combinatorial logic employed within control circuit 78.

Control circuit 78 determines if the fetch address hits in the search way (decision block 160). For example, control circuit 78 examines the output signals from remaining tag comparator 74 and the partial tag comparator 76A–76D corresponding to the search way. If the fetch address hits in the search way, control circuit 78 transmits the updated way prediction to line predictor 12 (step 162), deasserts the stall signal (step 164), and transitions the state machine to the access state (step 166).

On the other hand, if the fetch address does not hit in the search way, control circuit 78 determines if there are additional partial tag hits to search (decision block 168). For example, control circuit 78 may determine if there is a higher numbered way than the search way for which a partial tag hit is detected. If an additional partial tag hit is detected, control circuit 78 initiates a read of the next partial tag hit (step 170). For example, control circuit 78 may select the next higher numbered way from the search way for which a partial tag hit is detected. Additionally, control circuit 78 continues to assert the stall signal to allow for the next way to be searched (step 172). If there are no additional partial tag hits to search, control circuit 78 asserts the miss signal to external interface unit 46 (step 174) and transitions the state machine to the access state (step 176).

It is noted that the term control circuit is used herein to refer to any combination of circuitry (e.g. combinatorial logic gates, data flow elements such as muxes, registers, latches, flops, adders, shifters, rotators, etc., and/or circuits implementing state machines) which operates on inputs and generates outputs in response thereto as described. Additionally, as used herein, the term "asserted" refers to providing a logically true value for a signal or a bit. A signal or bit may be asserted if it conveys a value indicative of a particular condition. Conversely, a signal or bit may be "deasserted" if it conveys a value indicative of a lack of a particular condition. A signal or bit may be defined to be asserted when it conveys a logical zero value or, conversely, when it conveys a logical one value, and the signal or bit may be defined as deasserted when the opposite logical value is conveyed.

Computer Systems

Figure 10:
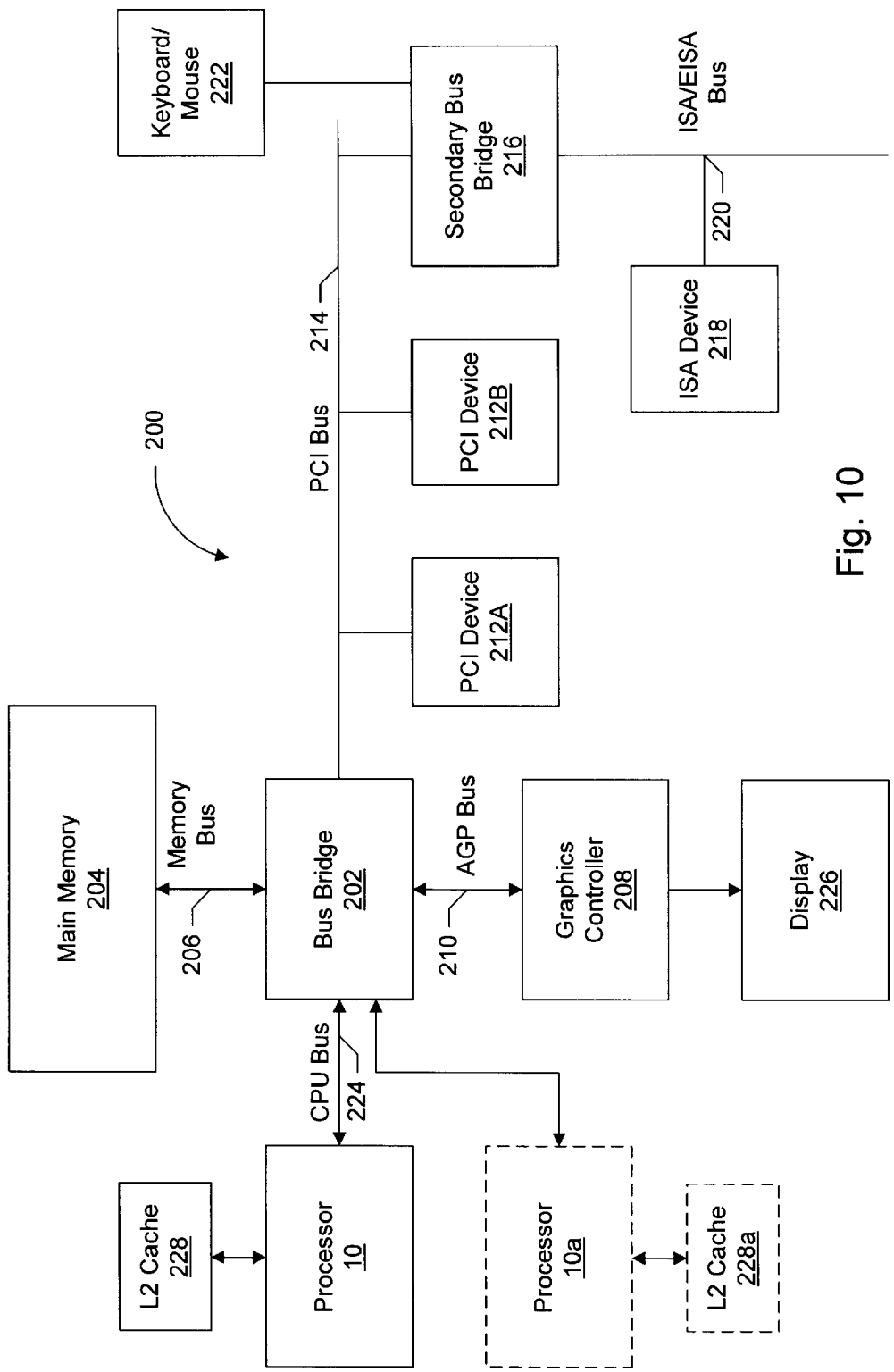
FIG. 10 is a block diagram of one embodiment of a computer system including the processor shown in FIG. 1.

Turning now to FIG. 10, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise external interface 52.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10*a* shown as an optional component of computer system 200). Processor 10*a* may be similar to processor 10. More particularly, processor 10*a* may be an identical copy of processor 10. Processor 10*a* may be connected to bus bridge 202 via an independent bus (as shown in FIG. 10) or may share CPU bus 224 with processor 10. Furthermore, processor 10*a* may be coupled to an optional L2 cache 228*a* similar to L2 cache 228.

Figure 11:
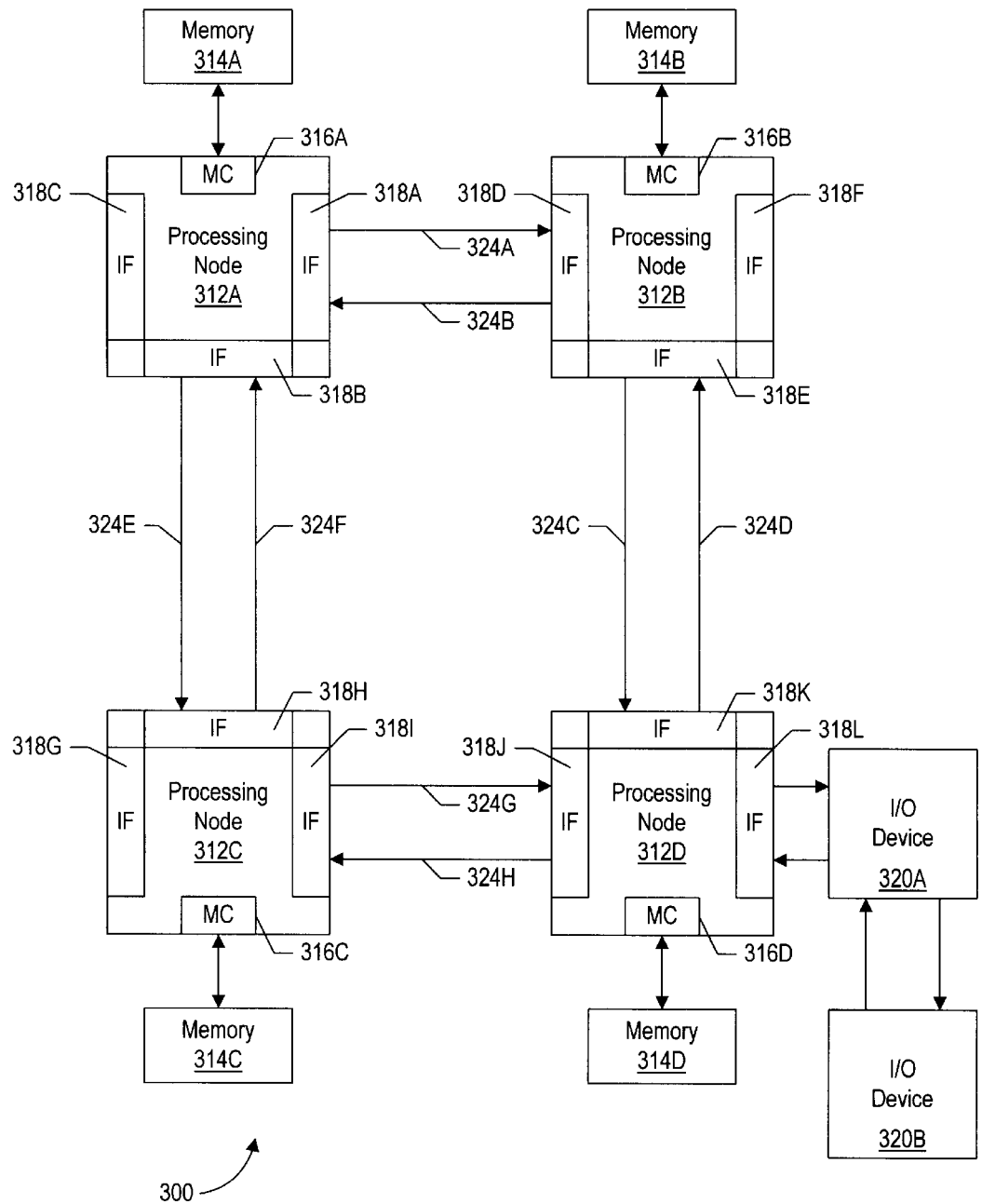
FIG. 11 is a block diagram of a second embodiment of a computer system including the processor shown in FIG. 1.

Turning now to FIG. 11, another embodiment of a computer system 300 is shown. Other embodiments are possible and contemplated. In the embodiment of FIG. 11, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 11. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a noncoherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 11. Any suitable routing algorithm may be used. Other embodiments of computer system 300 may include more or fewer processing nodes then the embodiment shown in FIG. 11.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, a processing node 312A–312D may comprise processor 10. External interface unit 46 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/P devices 320A–320B may include network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Numerous variations and modifications will become apparent to those skilled in the art once the above disclosure is fully appreciated. It is intended that the following claims be interpreted to embrace all such variations and modifications.

What is claimed is:

1. A cache comprising:
   a tag array coupled to receive an index of a read address and a way selection, wherein said tag array comprises a plurality of ways, and wherein said tag array is configured to output a plurality of partial tags, and wherein each of said plurality of partial tags is from one of said plurality of ways; and
   a control circuit coupled to said tag array, wherein said control circuit is configured to generate a search way selection identifying a search way responsive to said read address missing in a first way of said plurality of ways of said tag array, said first way identified by said way selection, and wherein a first partial tag from said search way matches a corresponding portion of said read address.

2. The cache as recited in claim 1 wherein said tag array is further configured to output a first tag from said first way, and wherein said control circuit is configured to determine that said read address is a miss in said first way responsive to said first tag not matching a tag portion of said read address.

3. The cache as recited in claim 2 wherein said tag array is configured to output a partial tag portion of said first tag in response to said index, and wherein said tag array is configured to output a remaining tag portion of said first tag in response to said index and said way selection.

4. The cache as recited in claim 3 further comprising:
   a first comparator coupled to receive said remaining tag portion of said first tag and a second corresponding portion of said read address, wherein said first comparator is configured to provide a comparison result signal to said control circuit; and
   a plurality of comparators, wherein a first one of said plurality of comparators is coupled to receive said partial tag portion of said first tag and wherein each other one of said plurality of comparators is coupled to receive one of said plurality of partial tags, and wherein each of said plurality of comparators is coupled to receive said corresponding portion of said read address; and wherein each of said plurality of comparators is coupled to provide a comparison result signal to said control circuit.

5. The cache as recited in claim 1 further comprising a multiplexor coupled to receive an input way prediction and said search way selection, wherein said multiplexor is configured to select between said input way prediction and said search way selection and is coupled to provide said way selection to said tag array.

6. The cache as recited in claim 5 wherein said control circuit is coupled to provide a selection control to said multiplexor and is configured to cause a selection of said input way selection responsive to said control circuit not generating said search way selection.

7. The cache as recited in claim 6 wherein said control circuit is configured to cause a selection of said search way selection responsive to generating said search way selection.

8. The cache as recited in claim 7 wherein, if said read address misses said search way, said control circuit is configured to generate a second search way selection responsive to a second partial tag from said second search way matching said corresponding portion of said read address.

9. The cache as recited in claim 1 wherein said control circuit is configured to assert a miss signal responsive to said read address missing in said first way and none of said plurality of partial tags matching said corresponding portion of said read address.

10. The cache as recited in claim 9 wherein said control circuit is further configured to assert said miss signal responsive to said read address missing in said first way, searching each of said plurality of ways for which a corresponding partial tag matches said corresponding portion of said read address, and missing in said each of said plurality of ways.

11. A processor comprising:
   a line predictor configured to provide a way prediction responsive to a fetch address; and
   an instruction cache coupled to receive said way prediction and said fetch address, wherein said instruction cache is set associative and includes a tag array configured to output a plurality of partial tags responsive to an index of said fetch address, and wherein said instruction cache is configured, responsive to said fetch address missing in a first way identified by said way prediction, to search a second way of said tag array for which a corresponding partial tag of said plurality of partial tags matches a corresponding portion of said fetch address.

12. The processor as recited in claim 11 wherein, if said instruction cache determines that said fetch address misses in said second way, said instruction cache is configured to search additional ways for which corresponding partial tags match said corresponding portion of said fetch address until either a hit is detected or said instruction cache exhausts ways for which corresponding partial tags match said corresponding portion of said fetch address.

13. The processor as recited in claim 12 wherein said instruction cache is further configured to assert a miss signal responsive to a miss of said fetch address in said first way and: (i) none of said plurality of partial tags matching said corresponding portion of said fetch address; or (ii) exhausting said ways for which corresponding partial tags match said corresponding portion of said fetch address without detecting a hit of said fetch address.

14. The processor as recited in claim 12 wherein, responsive to detecting a hit in said second way or said additional ways, said instruction cache is configured to provide an updated way prediction to said line predictor.

15. A computer system comprising:
   a processor including:
      a line predictor configured to provide a way prediction responsive to a fetch address; and
      an instruction cache coupled to receive said way prediction and said fetch address, wherein said instruction cache is set associative and includes a tag array configured to output a plurality of partial tags responsive to an index of said fetch address, and wherein said instruction cache is configured, responsive to said fetch address missing in a first way identified by said way prediction, to search a second way of said tag array for which a corresponding partial tag of said plurality of partial tags matches a corresponding portion of said fetch address; and
   an input/output (I/O) device configured to communicate between said computer system and another computer system to which said I/O device is couplable.

16. The computer system as recited in claim 15 wherein said I/O device comprises a modem.

17. The computer system as recited in claim 15 further comprising an audio I/O device.

18. The computer system as recited in claim 17 wherein said audio I/O device comprises a sound card.

19. The computer system as recited in claim 15 further comprising a second processor identical to said processor.

20. The computer system as recited in claim 15 further comprising a second processor comprising:
   a second line predictor configured to provide a second way prediction responsive to a second fetch address; and
   a second instruction cache coupled to receive said second way prediction and said second fetch address, wherein said second instruction cache is set associative and includes a second tag array configured to output a second plurality of partial tags responsive to an index of said second fetch address, and wherein said second instruction cache is configured, responsive to said second fetch address missing in a third way identified by said second way prediction, to search a fourth way of said second tag array for which a corresponding partial tag of said second plurality of partial tags matches a corresponding portion of said second fetch address.

21. A method comprising:
   reading a plurality of partial tags from a cache responsive to an address;
   determining whether or not said address hits in a predicted way of said cache;
   selecting a second way of said cache to check for a hit responsive to determining that said address does not hit in said predicted way of said cache and further responsive to a first partial tag of said plurality of partial tags matching a corresponding portion of said address, said first partial tag corresponding to said second way; and
   searching said second way of said cache for a hit.

22. The method as recited in claim 21 wherein said determining comprises:
   reading a tag from said predicted way; and
   comparing said tag to a tag portion of said address.

23. The method as recited in claim 21 further comprising:
   determining whether or not said address hits in said second way; and
   searching a third way of said cache for a hit in response to said determining said address does not hit in said second way of said cache, said third way different from said predicted way and said second way and a second partial tag of said plurality of partial tags corresponding to said third way matching said corresponding portion of said address.

24. The method as recited in claim 21 further comprising generating a miss signal responsive to said determining that said address does not hit in said predicted way and none of said plurality of partial tags matching said corresponding portion of said address.

25. The method as recited in claim 21 further comprising generating a miss signal responsive to said determining that said address does not hit in said predicted way and not detecting a hit in searching each way for which a corresponding partial tag of said plurality of partial tags matches said corresponding portion of said address.

26. The method as recited in claim 21 further comprising providing an updated way prediction responsive to detecting a hit in a way different from said predicted way.

27. A cache comprising:
   a tag array coupled to receive an index of an address and a way prediction, wherein the tag array comprises a plurality of ways, and wherein the way prediction identifies a predicted way of the plurality of ways, and wherein the tag array is configured to output a plurality of partial tags, and wherein each of the plurality of partial tags corresponds to one of the plurality of ways; and a control circuit coupled to the tag array, wherein the control circuit is configured to generate a search way indication identifying a search way responsive to the address missing in the predicted way, and wherein the search way is a non-predicted way of the plurality of ways, and wherein a first partial tag corresponding to the search way matches a corresponding portion of the address.

28. The cache as recited in claim 27 wherein the tag array is further configured to output a first full tag from the predicted way, and wherein the control circuit is configured to determine that the address is a miss in the predicted way responsive to the first full tag not matching a tag portion of the address.

29. The cache as recited in claim 28 wherein the tag array is configured to output a partial tag portion of the first full tag in response to the index, and wherein the tag array is configured to output a remaining tag portion of the first full tag in response to the index and the way prediction.

30. The cache as recited in claim 29 further comprising:

a first comparator coupled to receive the remaining tag portion of the first full tag and a second corresponding portion of the address, wherein the first comparator is configured to provide a comparison result signal to the control circuit; and a plurality of comparators, wherein a first one of the plurality of comparators is coupled to receive the partial tag portion of the first full tag and wherein each other one of the plurality of comparators is coupled to receive a different one of the plurality of partial tags, and wherein each of the plurality of comparators is coupled to receive the corresponding portion of the address, and wherein each of the plurality of comparators is coupled to provide a comparison result signal to the control circuit.

31. The cache as recited in claim 27 wherein, if the address misses the search way, the control circuit is configured to generate a second search way indication identifying a second search way of the plurality of ways, where the second search way is a second non-predicted way of the plurality of ways, and wherein the control circuit is configured to generate the second search way indication responsive to a second partial tag corresponding to the second search way matching the corresponding portion of the address.

32. The cache as recited in claim 27 wherein the control circuit is configured to assert a miss signal responsive to the address missing in the predicted way and none of the plurality of partial tags matching the corresponding portion of the address.

33. The cache as recited in claim 32 wherein the control circuit is further configured to assert the miss signal responsive to the address missing in the predicted way, searching each of the plurality of ways for which a corresponding partial tag matches the corresponding portion of the address, and missing in the searched ones of the plurality of ways.

* * * * *